United States Patent Office 3,397,199
Patented Aug. 13, 1968

3,397,199
NITROTHENYLIDENEAMINO COMPOUNDS
George L. Dunn, Willingboro, N.J., assignor to Smith Kline & French Laboratories, Philadelphia, Pa., a corporation of Pennsylvania
No Drawing. Filed Dec. 2, 1964, Ser. No. 415,453
19 Claims. (Cl. 260—240)

ABSTRACT OF THE DISCLOSURE 1-(5-nitro-2-thenylideneamino)pyrimidines and imidazolines are prepared by reaction of 5-nitrothiophene-2-carboxaldehyde with a 1-aminopyrimidine or imidazolidine. The products possess anti-trichomonal activity.

This invention relates to nitrothenylideneamino compounds. In particular, the invention relates to 1-(5-nitro-2-thenylideneamino)pyrimidines and imidazolines having unusual antitrichomonal activity.

The compounds of the invention have been found to have an unexpectedly high potency against the protozoan Trichomonas, of an order of magnitude many times that of the corresponding nitrofurans.

The compounds of the invention are represented by the following structural formula:

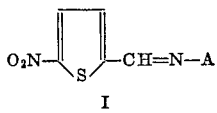

wherein:

A is

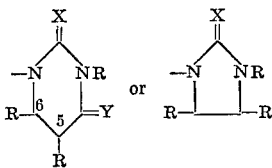

R is hydrogen or lower alkyl of up to six carbon atoms;
X is O, S or NH; Y is $H_2$ or O; and the 5-6 bond is a single or a double bond.

A preferred group of compounds is represented by the following structural formula:

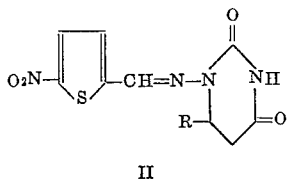

where R is lower alkyl.

A preferred compound within this latter group is 1-(5-nitro-2-thenylideneamino)-6-methyl-5,6 - dihydrouracil (III).

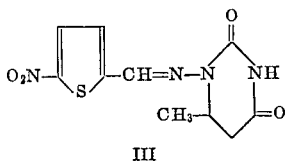

This compound has been found to possess potent activity against the microorganism Trichomonas foetus when evaluated in standard tests.

Another preferred group of compounds is represented by the following formula:

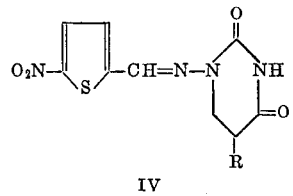

where R is a lower alkyl.

A preferred compound within this group is 1-(5-nitro-2-thenylideneamino)-5-methyl-5,6-dihydrouracil (V), which has great potency against Trichomonas.

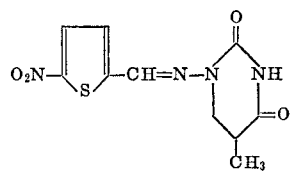

Another preferred species within the scope of Formula I is 1-(5-nitro-2-thenylideneamino)-5,6 - dihydrouracil (VI).

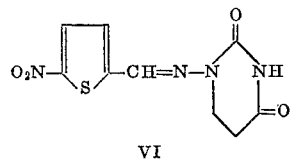

Yet another preferred species within the scope of Formula I is 1-(5-nitro-2-thenylideneamino)tetrahydro-2-(1H)-pyrimidone (VII).

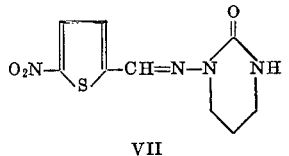

This compound has particularly high activity against Trichomonas. When compared with the corresponding furan compound, it was found to be many times as potent.

The nitrothenylideneaminopyrimidine compounds of the invention are crystalline solids which are generally prepared by the condensation of an appropriately substituted 1-aminopyrimidine with 5-nitrothiophene-2 - carboxaldehyde or its diacetate. The aminopyrimidine is conveniently prepared and kept as its benzylidene Schiff base derivative, and thus the condensation with the thiophene compound is preceded by hydrolysis of the benzylidene moiety. The benzylidene compound is refluxed in an aqueous mineral acid such as hydrochloric acid, and the by-product benzaldehyde is removed by distillation. An alcoholic solution of 5-nitrothiophene-2-carboxaldehyde or its diacetate is then added, resulting in the formation and precipitation of the desired product. The compound is purified by recrystallization from a solvent such as acetonitrile or a solvent pair such as ethanoldimethylformamide or ethanol-acetic acid.

Certain of the benzylidene Schiff bases are described in J. Med. Pharm. Chem. 3, 353 (1961). Others are prepared in the following manner. An acrylate ester is condensed with acetone semicarbazone to form a 1-isopropylideneamino-5,6-dihydrouracil. This compound is hydrolyzed by mineral acid to a 1-amino-5,6-dihydrouracil which can be used directly in a reaction with the 5-nitrothiophene-2-carboxaldehyde. More conveniently, it is converted to the benzylidene derivative by reaction with benzaldehyde in dilute hydrochloric acid. Choice of the appropriate acrylate ester determines the presence or absence of an alkyl group at the 5 or 6-position of the uracil (pyrimidine) ring. A 2-alkylacrylate leads to a 5-alkyluracil, a 3-alkylacrylate leads to a 6-alkyluracil. A propiolate may be substituted for the acrylate in order to produce uracil compounds with a 5,6-double bond. Among the acrylate and propiolate starting materials which are suitable are ethyl 2-ethylacrylate, ethyl 2-propylacrylate, ethyl 2-butylacrylate, ethyl 3-methylacrylate, ethyl 2-isopropylacrylate, ethyl 2-pentylacrylate, ethyl 3-methylpropiolate, ethyl 3-pentylpropiolate, and ethyl 3-ethylpropiolate.

Pyrimidines which lack the 4-oxo group, and are therefore not uracils, are prepared by starting with a tetrahydro-2-(1H)-pyrimidone and nitrosating at the 1-position with sodium nitrite in a mineral acid such as sulfuric acid. Zinc dust in sulfuric acid reduces the nitroso compound to the 1-aminopyrimidone. Condensation with 5-nitrothiophene-2-carboxaldehyde results in the formation of the product of Formula I, in which Y is two hydrogen atoms.

Compounds of Formula I in which the 3-position nitrogen is alkylated are prepared by treating the 3-unsubstituted benzylideneaminopyrimidine in dilute aqueous sodium hydroxide solution with a lower alkyl sulfate or halide. Suitable alkylating agents include dimethyl sulfate, diethyl sulfate, propyl iodide, and butyl iodide. Condensation with 5-nitrothiophene-2-carboxaldehyde is then carried out with the 3-alkyl compound. Alternatively, alkylation with an appropriate agent may be carried out on a final product of Formula I, in which the R group at position 3 is hydrogen.

Pyrimidines of Formula I in which X is sulfur or imino (NH) and Y is two hydrogen atoms are prepared by using as a starting material tetrahydro-2(1H)-pyrimidinethione or 2-iminohexahydropyrimidine, respectively, nitrosating at the 1-position with sodium nitrite in acid, reducing the nitroso group to an amino group with zinc dust and sulfuric acid, and then condensing with 5-nitrothiophene-2-carboxaldehyde to give the final product. When it is desired to prepare a pyrimidine of Formula I in which X is sulfur and Y is oxygen, a 1-benzylideneamino-2-thio-5,6-dihydrouracil is first prepared from methyl acrylate, benzaldehyde, and acetone thiosemicarbazone, following which this compound is condensed with 5-nitrothiophene-2-carboxaldehyde. By using isopropylideneaminoguanidine instead of acetone semicarbazone, the corresponding compound in which X is NH is produced.

Imidazolidines of Formula I are prepared by treating a properly substituted imidazolidine with nitrous acid (sodium nitrite and an acid), reducing the nitroso group, and then condensing the aminoimidazolidine with 5-nitrothiophene-2-carboxaldehyde. The starting material may have an oxygen or a sulfur atom or an imino group in the 2-position, and the 3, 4, and/or 5-positions may be substituted with a lower alkyl group.

It will be evident that the basic amino compounds of the present invention can be converted into their nontoxic, pharmaceutically acceptable acid addition salts. Such salts include, but are not limited to, the sulfate, hydrochloride, hydrobromide, citrate, pamoate, maleate, cyclohexylsulfamate, nitrate, acetate, tartrate, and succinate. Such salts are the full equivalents of the free bases and are included within the scope of this invention. In addition, certain of the compounds of the invention, because of their acidic nature, form alkali metal salts, particularly sodium and potassium salts. Such salts are also the full equivalents of the compounds specifically claimed.

The following examples are to be considered as illustrative of the compounds of the invention, but are not to be construed as limitative of the scope thereof.

EXAMPLE 1

1-(5-nitro-2-thenylideneamino)-5,6-dihydrouracil

A solution of 1-benzylideneamino-5,6-dihydrouracil [J. Med. Pharm. Chem. 3, 353 (1961)] (4.3 g., 0.02 mole) in 1:1 aqueous hydrochloric acid (50 ml.) is heated to reflux and the benzaldehyde formed removed by distillation. The clear solution is diluted with 50 ml. of water and, while still hot, a solution of 5-nitrothiophene-2-carboxaldehyde (3.14 g., 0.02 mole) in 50 ml. of ethanol is added causing immediate precipitation of an orange solid. The mixture is allowed to stir fifteen minutes, cooled to 10°, and the solid collected.

Recrystallization from 1:1 ethanol-dimethylformamide gives a yellow crystalline product, M.P. 284–285° dec.

EXAMPLE 2

1-(5-nitro-2-thenylideneamino)-6-methyl-5,6-dihydrouracil

Following the procedure outlined above, but substituting 1-benzylideneamino-6-methyl-5,6-dihydrouracil [J. Med. Pharm. Chem. 3, 353 (1961)] (4.6 g., 0.02 mole), there is obtained a crude yellow product. Recrystallization from ethanol-acetic acid gives the title product as yellow microcrystals, M.P. 221.5–222.5° dec.

EXAMPLE 3

1-(5-nitro-2-thenylideneamino)-6-ethyl-5,6-dihydrouracil

To a solution of sodium (4.6 g., 0.2 mole) in dry ethanol (100 ml.) is added acetone semicarbazone (23 g., 0.2 mole) and ethyl 3-ethylacrylate (25.6 g., 0.2 mole), and the mixture is heated at reflux for sixteen hours. The cooled cloudy solution is poured into a mixture of water (100 ml.) and concentrated hydrochloric acid (20 ml.), benzaldehyde (21.2 g., 0.2 mole) is added and the mixture is heated to 60° briefly, then cooled to 10°, and allowed to stir for one hour. The precipitated solid is collected and then suspended in a stirred cold solution of sodium hydroxide (6.5 g.) in water (150 ml.). After stirring for thirty minutes, the insoluble benzaldehyde semicarbazone is removed by filtration. The clear filtrate is added slowly to a cold stirred solution of 10% aqueous hydrochloric acid (55 ml.), the precipitated solid collected and recrystallized twice from ethanol to give colorless crystals, M.P. 133–135°, of 1 - benzylideneamino - 6-ethyl-5,6-dihydrouracil.

By substituting 4.9 g. (0.02 mole) of this 6-ethyluracil for the 6-unsubstituted uracil and following the procedure of Example 1, a crude yellow precipitate is obtained. Recrystallization from ethanol-acetic acid, ethanol-dimethylformamide, and then from acetonitrile gives the title product as pure yellow crystals, M.P. 203–205° dec.

EXAMPLE 4

1-(5-nitro-2-thenylideneamino)-6-propyl-5,6-dihydrouracil

1 - benzylideneamino - 6-propyl-5,6-dihydrouracil, M.P. 138–139°, is obtained by starting with 28.4 g. (0.2 mole) of ethyl 3-propylacrylate and following the procedure of Example 3.

This benzylidene compound (5.2 g., 0.02 mole) is then treated according to the procedure of Example 1 to give a crude yellow product, M.P. 188–192°. This compound is then recrystallized from ethanol-acetic acid, ethanol-dimethylformamide, and then from acetonitrile to give yellow microcrystals of the title product, M.P. 201–203° dec.

EXAMPLE 5

1-(5-nitro-2-thenylideneamino)-6-butyl-5,6-dihydrouracil

The procedure described in Example 3 is carried out with ethyl 3-butylacrylate (31.2 g., 0.2 mole) to give after isolation and recrystallization from ethanol, 1-benzylideneamino-6-butyl-5,6-dihydrouracil, M.P. 140–141°.

This benzylidene compound (5.5 g., 0.02 mole) is then treated according to the procedure of Example 1 to give a crude yellow product, M.P. 165–180°. One recrystallization each from acetic acid-ethanol, ethanol-dimethylformamide and finally from acetonitrile gives the yellow title product, M.P. 178–180° dec.

EXAMPLE 6

1-(5-nitro-2-thenylideneamino)uracil

To a warm (40–50°) solution of sodium (4.6 g., 0.2 mole) in ethanol (75 ml.) is added acetone semicarbazone (23 g., 0.2 mole), followed by slow addition of ethyl propiolate (19.6 g.), (0.2 mole). The resulting orange mixture is heated at reflux for two hours and the product isolated as described for the preparation of 1-benzylideneamino-6-ethyl-5,6-dihydrouracil. Recrystallization of the crude product from ethanol-acetic acid gives 1-benzylideneaminouracil as colorless crystals, M.P. 223–224°.

By using 4.3 g. (0.02 mole) of 1-benzylideneaminouracil in the procedure of Example 1, a crude yellow solid, M.P. 293–296° dec., is obtained. Recrystallization from ethanol-dimethylformamide gives the title product as yellow crystals, M.P. 303–305° dec.

EXAMPLE 7

1-(5-nitro-2-thenylideneamino)-3,6-dimethyl-5,6-dihydrouracil

A solution of 1-benzylideneamino-6-methyl-5,6-dihydrouracil (11.6 g., 0.05 mole) in dilute aqueous sodium hydroxide (2.4 g., 0.06 mole in 50 ml. of water) is cooled (5–10°) and treated dropwise with dimethylsulfate (6.95 g., 0.055 mole) over a period of twenty-five minutes. After addition is complete, the mixture is allowed to stir at room temperature for forty minutes, then the precipitated solid is collected, washed with cold water and dried (9.2 g.). Recrystallization from heptane containing a little ether gives 1-benzylideneamino-3,6-dimethyl-5,6-dihydrouracil as colorless microcrystals, M.P. 89–91°.

By using 4.9 g. (0.02 mole) of this compound in the procedure of Example 1, there is obtained a crude yellow product, M.P. 177–178.5°. Recrystallization from ethanol-acetic acid gives the title product as yellow plates, M.P. 177.5–179°.

EXAMPLE 8

1-(5-nitro-2-thenylideneamine)-5-methyl-5,6-dihydrouracil

1 - benzylideneamino - 5 - methyl-5,6-dihydrouracil [J. Med. Pharm. Chem. 3, 353 (1961)] (2.31 g., 0.01 mole) is heated in refluxing 1:1 hydrochloric acid (25 ml.) and the benzaldehyde removed by distillation. The hot solution is diluted with water (25 ml.), then a solution of 5-nitro-2-thiophenecarboxaldehyde diacetate (2.59 g., 0.01 mole) in ethanol (25 ml.) is added and the mixture heated at reflux for fifteen minutes. Upon cooling, a yellow-orange solid separates, which is collected and air-dried. Recrystallization from ethanol-dimethylformamide gives the title product as yellow needles, M.P. 194–195° dec.

EXAMPLE 9

1-(5-nitro-2-thenylideneamino)tetrahydro-2(1H)-pyrimidone

A solution of tetrahydro-2(1H)-pyrimidone (5.9 g., 0.06 mole) in 2 N sulfuric acid (170 ml.) is cooled (0–5°), treated cautiously over ten minutes with sodium nitrite (4.1 g., 0.06 mole), and then allowed to stir for ninety minutes at 0–5°. Zinc dust (8.5 g., 0.14 mole) is added portionwise over forty minutes at 15–25°, then the mixture is allowed to stir fifteen minutes longer. Excess zinc is removed by filtration and the clear filtrate is then treated with 5-nitrothiophene-2-carboxaldehyde (8.8 g., 0.056 mole) dissolved in methanol (50 ml.). The orange precipitate is collected and air-dried to give a crude yellow product, M.P. 255–258°. Recrystallization from ethanol-acetic acid gives the pure yellow product, M.P. 260.5–261.5°.

EXAMPLE 10

1-(5-nitro-2-thenylideneamino)-2-thio-5,6-dihydrouracil

To a solution of sodium (4.6 g., 0.2 mole) in ethanol (100 ml.) is added acetone thiosemicarbazone (26.2 g., 0.2 mole) and methyl acrylate (17.2 g., 0.2 mole) and the mixture allowed to reflux sixteen hours. After cooling, the mixture is poured into a solution of concentrated hydrochloric acid (20 ml.) in water (100 ml.). Benzaldehyde (21.2 g., 0.2 mole) is added, the mixture heated to 60°, then cooled to 10°, and the heavy precipitate collected. The solid is stirred into a solution of sodium hydroxide (6 g.) in 150 ml. of water and ice (50 g.), then filtered into a stirred solution of 10% hydrochloric acid (55 ml.). The solid which separates from the filtrate is collected and air-dried to give 1-benzylideneamino-2-thio-5,6-dihydrouracil.

1-benzylideneamino-2-thio-5,6-dihydrouracil (4.66 g., 0.02 mole) is disolved in 1:1 hydrochloric acid (50 ml.) and the benzaldehyde formed removed by distillation. To the warm residue is added a solution of 5-nitro-2-thiophenecarboxaldehyde (3.14 g., 0.02 mole) in ethanol (50 ml.). The orange precipitate, which forms immediately, is collected and dried in vacuo to give the title product.

EXAMPLE 11

1-(5-nitro-2-thenylideneamino)-2-imino-5,6-dihydrouracil

By following the procedure set forth in Example 10, but using isopropylideneaminoguanidine (18.8 g., 0.2 mole) instead of acetone thiosemicarbazone, 1-benzylideneamino-2-imino-5,6-dihydrouracil is prepared.

By following the procedure set forth in Example 1, but using 1-benzylideneamino-2-imino-5,6-dihydrouracil (4.34 g., 0.02 mole) instead of 1-benzylideneamino-5,6-dihydrouracil, the title compound is prepared.

EXAMPLE 12

1-(5-nitro-2-thenylideneamino)-2-imidazolidinethione 2-imidazolidinethione (4.1 g., 0.04 mole) is added to a mixture of 2 N sulfuric acid (110 ml.) and dioxane (40 ml.). A solution of sodium nitrite (2.75 g., 0.04 mole) in water (10 ml.) then is added over one hour while maintaining the temperature at about 0°. After addition is complete, the mixture is allowed to stir at 0° for 30 minutes, then 6.0 g. of zinc dust is added over fifteen minutes, so that the temperature does not exceed 10°. After stirring for another ten minutes, excess zinc is removed by filtration and the clear filtrate treated with a solution of 5-nitro-2-thiophenecarboxaldehyde (6.3 g., 0.04 mole) in 50 ml. of 95% alcohol. The orange precipitate is collected, washed with 95% alcohol, and allowed to dry at 75° in vacuo to give the title product which is recrystallized as yellow microcrystals from acetonitrile.

EXAMPLE 13

1-(5-nitro-2-thenylideneamino)tetrahydro-2(1H)-pyrimidinethione

By following the procedure set forth in Example 12, but using tetrahydro-2-(1H)pyrimidinethione (4.6 g., 0.04 mole) instead of 2-imidazolidinethione, the title compound is obtained.

EXAMPLE 14

1-(5-nitro-2-thenylideneamino)-2-iminohexahydropyrimidine

By following the procedure set forth in Example 12, but using 2-iminohexahydropyrimidine (3.96 g., 0.04 mole) instead of 2-imidazolidinethione, the title product is obtained.

EXAMPLE 15

1-(5-nitro-2-thenylideneamino)-2-imidazolidinone

To a cold (5°) solution of 2-imidazolidinone (3.15 g., 0.037 mole) in 2 N sulfuric acid (100 ml.) is added sodium nitrite (2.5 g., 0.037 mole) over fifteen minutes. The solution is alowed to stir at 5° for one and one-half hours, then 5.5 g. of zinc dust is added over one hour so that the temperature does not rise above 15°. After addition is complete, the mixture is allowed to stir at 5° for thirty minutes, then at room temperature for one hour. Excess zinc is removed by filtration and then the clear filtrate is treated with a solution of 5-nitro-2-thiophenecarboxaldehyde (5.8 g., 0.037 mole) in 95% alcohol (40 ml.). The orange precipitate is collected and dried in vacuo to give the title product which is recrystallized from acetonitrile.

EXAMPLE 16

1-(5-nitro-2-thenylideneamino)-2-iminoimidazolidine

By following the procedure set forth in Example 15, but using 2-iminoimidazolidine (3.15 g., 0.037 mole) instead of 2-imidazolidinone, the title product is obtained.

EXAMPLE 17

By following the procedure set forth in Examples 3 and 1, but using ethyl 2-ethylacrylate (25.6 g., 0.2 mole), ethyl 2-pentylacrylate (34.0 g., 0.2 mole), and ethyl 3-ethylpropiolate (25.2 g., 0.2 mole) instead of ethyl 3-ethylacrylate, 1-(5-nitrothenylideneamino)-5-ethyl-5,6-dihydrouracil, 1-(5-nitrothenylideneamino)-5-pentyl-5,6-dihydrouracil, and 1-(5-nitrothenylideneamino)-6-ethyluracil, respectively, are obtained.

EXAMPLE 18

By following the procedure set forth in Example 15, but using 4-methyl-2-imidazolidinone (3.70 g., 0.037 mole), 4,5-dimethyl-2-imidazolidinone (4.22 g., 0.037 mole), 1-ethyl-2-imidazolidinone (4.22 g., 0.037 mole), and 1-butyl-2-imidazolidinone (5.25 g., 0.037 mole) instead of 2-imidazolidinone, 1-(5-nitro-2-thenylideneamino)-4-methyl-2-imidazolidinone, 1-(5-nitro-2-thenylideneamino)-4,5-dimethyl-2-imidazolidinone, 1-(5-nitro-2-thenylideneamino)-3-ethyl-2-imidazolidinone, and 1-(5-nitro-2-thenylideneamino)-3-butyl - 2 - imidazolidinone, respectively, are obtained.

I claim:

1. A compound of the structure:

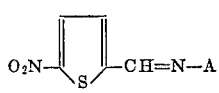

where

A is selected from the group consisting of

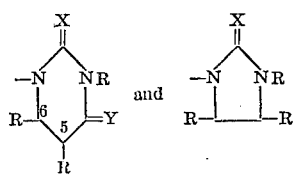

R is selected from the group consisting of hydrogen and lower alkyl of up to six carbon atoms;

X is selected from the group consisting of O, S, and NH;

Y is selected from the group consisting of O and H₂; and the 5–6 bond is selected from the group consisting of a single bond and a double bond with the proviso that when the 5–6 bond is a double bond, the R group at the 5-position is hydrogen.

2. A compound of the structure:

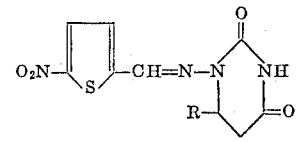

where R is lower alkyl of up to six carbon atoms.

3. A compound of the structure:

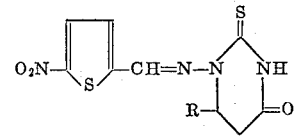

where R is lower alkyl of up to six carbon atoms.

4. A compound of the structure:

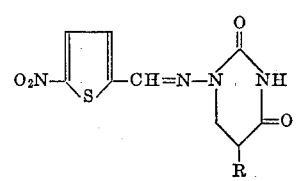

where R is lower alkyl of up to six carbon atoms.

5. A compound of the structure:

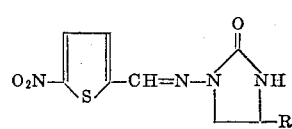

where R is lower alkyl of up to six carbon atoms.

6. A compound of the structure:

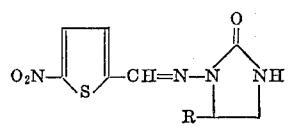

where R is lower alkyl of up to six carbon atoms.

7. 1 - (5 - nitro-2-thenylideneamino)-6-methyl-5,6-dihydrouracil.

8. 1 - (5 - nitro-2-thenylideneamino)-5-methyl-5,6-dihydrouracil.

9. 1 - (5 - nitro-2-thenylideneamino)-5,6-dihydrouracil.

10. 1 - (5 - nitro - 2 - thenylideneamino)tetrahydro - 2 - (1H)-pyrimidone.

11. 1 - (5 - nitro-2-thenylideneamino)-6-ethyl-5,6-dihydrouracil.

12. 1 - (5 - nitro-2-thenylideneamino)-6-propyl-5,6-dihydrouracil.

13. 1 - ( 5- nitro-2-thenylideneamino)-6-butyl-5,6-dihydrouracil.

14. 1-(5-nitro-2-thenylideneamino)uracil.

15. 1 - ( 5- nitro-2-thenylideneamino)-3,6-dimethyl-5,6-dihydrouracil.

16. 1 - (5 - nitro - 2-thenylideneamino)-2-imidazolidinone.

17. 1 - (5-nitro-2-thenylideneamino)tetrahydro-2-(1H)-pyrimidinethione.

18. 1-(5-nitro-2-thenylideneamino)-2-thio-5,6-dihydrouracil.
19. 1-(5-nitro-2-thenylideneamino)-2-imino-5,6-dihydrouracil.

References Cited

UNITED STATES PATENTS

| | | | |
|---|---|---|---|
| 3,103,518 | 9/1963 | Prosser | 260—240 |
| 3,601,992 | 9/1961 | Bellamy et al. | 260—240 |
| 2,920,074 | 1/1960 | Michels | 260—240 |
| 2,746,960 | 5/1956 | Gever et al. | 260—240 |

FOREIGN PATENTS 939,941  10/1963  Great Britain.

OTHER REFERENCES

Smith et al.: J. Med. Chem., vol. 1, pp. 528–31 (1959).
Application 1016M, France, Dec. 26, 1961.

JAMES A. PATTEN, *Primary Examiner.*

H. I. MOATZ, *Assistant Examiner.*